(12) United States Patent
Tagunov

(10) Patent No.: US 9,133,890 B2
(45) Date of Patent: Sep. 15, 2015

(54) FRICTION CLUTCH WITH ADJUSTING DEVICE

(71) Applicant: Schaeffler Technologies AG & Co. KG, Herzogenaurach (DE)

(72) Inventor: Dmitrij Tagunov, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 30 days.

(21) Appl. No.: 14/158,020

(22) Filed: Jan. 17, 2014

(65) Prior Publication Data

US 2014/0131161 A1 May 15, 2014

Related U.S. Application Data

(63) Continuation of application No. PCT/DE2012/000659, filed on Jul. 2, 2012.

(30) Foreign Application Priority Data

Jul. 22, 2011 (DE) .......................... 10 2011 079 630

(51) Int. Cl.
*F16D 13/75* (2006.01)
*F16D 13/44* (2006.01)
*F16D 21/06* (2006.01)

(52) U.S. Cl.
CPC .............. *F16D 13/44* (2013.01); *F16D 13/757* (2013.01); *F16D 2021/0684* (2013.01)

(58) Field of Classification Search
None
See application file for complete search history.

(56) References Cited

U.S. PATENT DOCUMENTS

| 4,429,776 | A | * | 2/1984 | Maucher et al. ............ 192/99 A |
| 6,012,561 | A | | 1/2000 | Reed, Jr. et al. |
| 6,390,265 | B1 | | 5/2002 | Weydmann |
| 2008/0078642 | A1 | * | 4/2008 | Swinford-Meyer et al. ......................... 192/70.27 |

FOREIGN PATENT DOCUMENTS

DE 2314006 A 2/2002

* cited by examiner

*Primary Examiner* — Rodney H Bonck
(74) *Attorney, Agent, or Firm* — Simpson & Simpson, PLLC

(57) ABSTRACT

A friction clutch, for example, a dual clutch, having traction mode and power take-off, with a pressure plate that is axially pre-stressed, applying a load to a cup spring, against an opposing pressure plate while tensioning friction linings of a clutch plate, the pressure plate being displaceable against the effect of the cup spring by means of pressure levers distributed along the periphery that are rotatably arranged by means of first pivot joints on knee levers that are axially stressed by a disengaging mechanism and have a specifiable axial distance relative to the disengaging mechanism. In order to achieve a constant transmissibility of the existing torque in traction mode over the service life when there is wear of the friction linings, an automatic adjusting device is provided in series with the adjusting screws between the pressure levers and the pressure plate.

9 Claims, 3 Drawing Sheets

FRICTION CLUTCH WITH ADJUSTING DEVICE

CROSS-REFERENCE TO RELATED APPLICATIONS

This application is filed under 35 U.S.C. §120 and §365(c) as a continuation of International Patent Application No. PCT/DE2012/000659 filed Jul. 2, 2012, which application claims priority from German Patent Application No. 10 2011 079 630.4 filed Jul. 22, 2011, which applications are incorporated herein by reference in their entireties.

FIELD OF THE INVENTION

The invention relates to a friction clutch, and in particular, a dual clutch having a traction mode and power take-off, with a pressure plate that is axially pre-stressed, applying a load to a cup spring, against an opposing pressure plate while tensioning friction linings of a clutch plate, the pressure plate being displaceable against the effect of the cup spring by means of pressure levers distributed along the periphery that are rotatably arranged by means of first pivot joints on knee levers that are axially stressed by a disengaging mechanism and have a specifiable axial distance relative to the disengaging mechanism, and means for adjusting the axial distance.

BACKGROUND OF THE INVENTION

Friction clutches of this type known, for example, from German Patent No. 23 14 006 B2 are utilized as dual clutches in utility machines, for example tractors, in which the combustion engine transmits the delivered torque via the dual clutch designed as a module to a dual-shaft transmission having two transmission input shafts, where two friction clutches operable independently of each other by means of a disengaging mechanism, transmit torque to a power take-off and/or to a speed-changing transmission.

The friction clutch has a traction mode, operating between the crankshaft of the combustion engine and the transmission input shaft of the speed-changing transmission, and has a module including an opposing pressure plate and a housing, which may be designed in a single piece or separately, having an axially displaceable pressure plate non-rotatably received on the latter, which is pre-stressed by means of a cup spring against the opposing pressure plate with friction linings of a clutch plate interposed. The pressure plate here is situated on the side facing away from the disengaging mechanism; relative to the opposing pressure plate, and is disengaged as well as tightened by means of knee levers subjected to axial force, which then displace pressure levers. At the same time, with the friction clutch in the engaged state, a pre-definable axial clearance of, for example, 2 mm is preset by means of adjusting screws situated between the pressure levers and the pressure plate. If wear occurs on the friction linings, this axial clearance is gradually reduced until the knee lever comes to rest on the disengaging mechanism. In this way, the effect of the cup spring relative to the pressure plate can be reduced so that the friction clutch slips and the friction linings may possibly be subjected to high thermal loads. To rectify this condition, a manual adjustment with the friction clutch in the installed state is possible only by means of the mechanical disengaging system between the pedal and friction clutch to adjust the axial clearance between knee lever and disengaging mechanism.

BRIEF SUMMARY OF THE INVENTION

It is a general object of the invention to propose a friction clutch that manually adjusts the axial clearance over the service life superfluously or at least increases the adjustment intervals.

The invention includes a friction clutch, for example a dual clutch, having a traction mode and power take-off, with a pressure plate that is axially pre-stressed, applying a load to a cup spring, against an opposing pressure plate while tensioning friction linings of a clutch plate, the pressure plate being displaceable against the effect of the cup spring by means of pressure levers distributed along the periphery that are rotatably arranged by means of first pivot joints on knee levers that are axially stressed by a disengaging mechanism and have a specifiable axial clearance relative to the disengaging mechanism, and means for adjusting the axial clearance, where an automatic adjusting device is provided in series with the means. With the friction clutch engaged, depending on the distance, this adjusting device compensates for an axial clearance between the knee levers and the pressure plate which then decreases the wear of the friction linings, and thus, shifting in the direction of the disengaging mechanism, and hence fulfilling or completing in an automatic manner the function of an adjustment of the means, such as adjusting screws between the pressure plate and pressure levers.

In one embodiment, the adjusting device contains pressure levers that are situated at the knee levers, rotatable by means of the first pivot joints, with a second pivot joint which can be fixed at a plurality of axial positions on a pendulum piece, as well as stops of the pressure lever, which are effective at these positions relative to the pendulum piece. Through the simultaneous displacement of the pressure levers in the positions in the pivot joint and stops, the pressure levers move in the direction of the pressure plate when there is wear on the friction linings, where again enlarging a reduced axial clearance between knee levers and disengaging mechanism.

As this occurs, divisions of the positions of the multi-stage adjustable pivot joint and of the multi-stage adjustable stop are identical. In this case, the number of possible adjustments corresponds to the number of positions and stops. It has proven advantageous for the design of a robust friction clutch if, starting from a home position when the friction clutch is new, two to three additional catch positions of the adjusting device are provided. For example, a clutch plate having friction linings with a lining thickness of 10 mm may be provided, in which case an adjustment of the friction clutch occurs at 2 mm of wear, and the axial clearance is preset to 2 mm. If the thickness of the friction linings decreases, the axial clearance decreases until it is entirely depleted, and is then increased again to 2 mm when an adjustment occurs. This process can be repeated until the wear limit of the friction linings is reached, two times in this embodiment.

An adjustment occurs, for example, when the wear of the friction linings is exceeded over a division interval in the engaged state or a disengaging friction clutch contrary to the effect of the cup spring, by means of a displacement of a pivot pin of the pressure lever to a next adjoining position further distant from the knee lever and located closer to the pressure plate, and by means of a displacement of the pressure lever to a next adjoining stop further distant from the knee lever and located closer to the pressure plate.

To limit the travel of the knee levers, between a component that is fixed in relation to the opposing pressure plate or the opposing pressure plate itself and the knee levers, one leg spring for all or separately acting leg springs for each knee lever are provided, which maintain the pre-tensioning of the knee levers in relation to the adjusting device, the means for adjusting the axial clearance such as adjusting screws, and the like. It has proven to be advantageous, when an adjustment occurs, i.e., in the event of an axial displacement of the pendulum piece of the adjusting device in relation to the pressure levers in the direction of the knee levers, to limit the travel of the knee levers by means of the pre-tensioning of these leg springs or by means of a stop of the knee levers at the disengaging mechanism; that is, to counter the pendulum pieces in their displacement with an opposing force by means of the force of the cup spring. In this case, the adjustment can be impeded during a disengagement of the friction clutch, in that the second pivot joint prevents an adjustment corresponding to adjustable pincers, and adjusting is performed only in the engaged state. Alternatively, using an appropriate disengaging force, during the disengagement of the friction clutch the pivot joint can be displaced into the next position, in which case the corresponding disengaging force is held in opposition by the cup spring.

To carry out the displacement, when there is wear and the friction clutch is to engaged, there may be provision to lift a pivot pin of the pressure lever out of a joint socket of the second pivot joint by means of the pre-tensioning of the cup spring and move it into an adjacent joint socket in the direction of the opposing pressure plate. To this end, the pivot pin may be designed so that it can be moved in a radially inward direction.

To design a low-friction connection between the pressure levers and the associated stops of the pendulum piece, optimized for the adjusting process and the transmission of the disengaging force, these may be coordinated with each other with regard to their surfaces. For example, in the area of the stop for the pendulum piece the pressure lever may have a periphery that is asymmetrical in relation to the pivot point of the second pivot joint. The stops may be designed with a sawtooth pattern here, so that as the wear increases a transition to the next stop becomes simpler, but the disengagement motion is still transmitted reliably to the pendulum piece when there is not yet sufficient wear for an adjustment.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
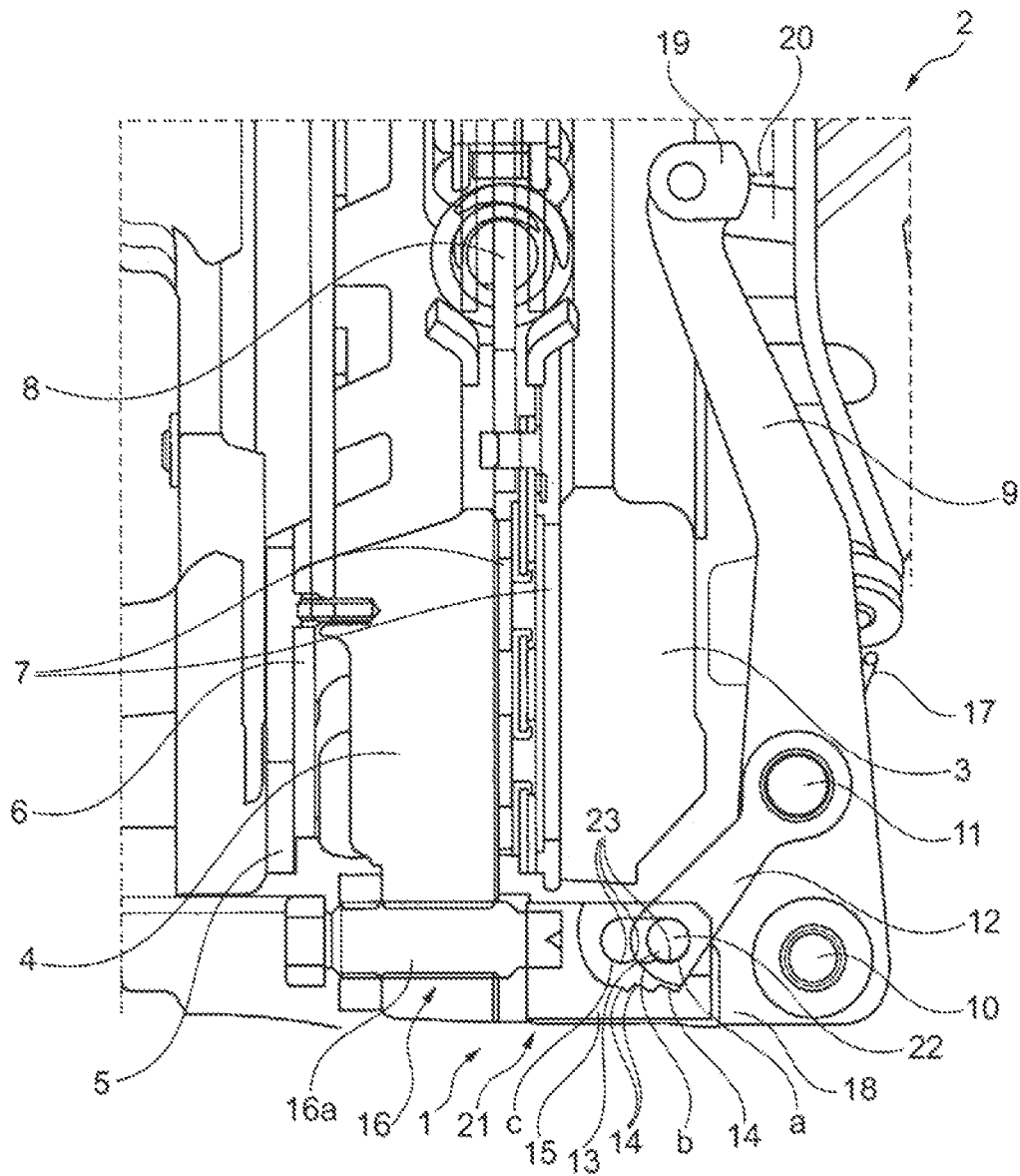
FIG. 1 is a partial sectional view of a friction clutch of the present invention with an automatic adjusting device, shown in an engaged state.

FIG. 1 is a partial sectional view of friction clutch 1 situated in a module of dual clutch 2 with a friction clutch of a power take-off, not depicted in detail, with the module turning on an axis of rotation of dual clutch 2, formed here for example, in a single piece from opposing pressure plate 3 and housing 18, and pressure plate 4 situated opposite the latter, so that it is rotationally fixed and axially movable relative to the latter, for example, by means of a cam guide. In the engaged state, pressure plate 4 is axially pre-tensioned contrary to the effect of cup spring 6 which is firmly braced axially by means of stop plate 5 against opposing pressure plate 3, with interposition of friction linings 7 of clutch plate 8 which is non-rotatingly connected to a transmission input shaft, not depicted, so that the maximum torque transmissible via friction clutch 1 is transmitted to the transmission input shaft by opposing pressure plate 3, which is connected to a flywheel of a crankshaft or the like, via friction lining 7 and clutch plate 8.

Friction clutch 1 is disengaged by moving pressure plate 4 axially contrary to opposing pressure plate 3. To this end, radially on the inside, plurality of knee levers 9 distributed around the periphery, which are supported by means of pivot bearings 10 by means of housing 18, which is rotatably connected radially on the outside firmly to opposing pressure plate 3 are subjected by a disengaging mechanism (not depicted) to an axial force, on which knee levers 9, by means of first pivot joints 11, pressure levers 12 act axially by means of second pivot joints 13 and stops 14 on axially movable pendulum pieces 15, which in turn axially displace adjusting screws 16a, which are firmly connected to pressure plate 4. Means 16 such as adjusting screws 16a are placed only on pendulum pieces 15. To ensure the contact of the latter, leg spring 17, which is braced on housing 18, is placed on knee levers 9, which leg spring 17 pre-tensions knee levers 9 contrary to the effect of cup spring 6 via pressure levers 12 and pendulum pieces 15 against adjusting screws 16a, and thus, against pressure plate 4.

When friction clutch 1 is new, axial clearance 20 between the disengaging mechanism and pressure members 19 of knee levers 9 is set, for example, at the height of 2 mm by means of adjusting screws 16a. As the wear of friction linings 7 increases, this axial clearance 20 decreases, so that if other measures are not taken the disengaging mechanism finally touches the pressure members and possibly brings force to bear on them, so that friction clutch 1 can no longer transmit the maximum transmissible torque, and the high friction applies stress to the friction linings in an unacceptable manner.

To avoid this and to spare additional manual adjusting procedures on the disengaging mechanism (not shown), as a mechanical disengaging system, friction clutch 1 has automatic and self-adjusting adjusting device 21, which is made up of pressure levers 12, second pivot joints 13 and axially movable pendulum pieces 15. In this case, pivot joints 13 are made from pivot pins 22, which are rotatably receivable in plurality of joint sockets 23 having positions a, b, c and which are situated axially adjacent to each other at predefined intervals. Furthermore, pressure levers 12 are braced against sawtooth-like stops 14, for example, which are situated axially adjacent to each other at the same intervals radially outside of the joint sockets in the pendulum pieces; while, depending on the wear condition of friction linings 7, stop 14 increasingly approximate to pressure plate 4 is occupied by pressure lever 12.

Figure 2:
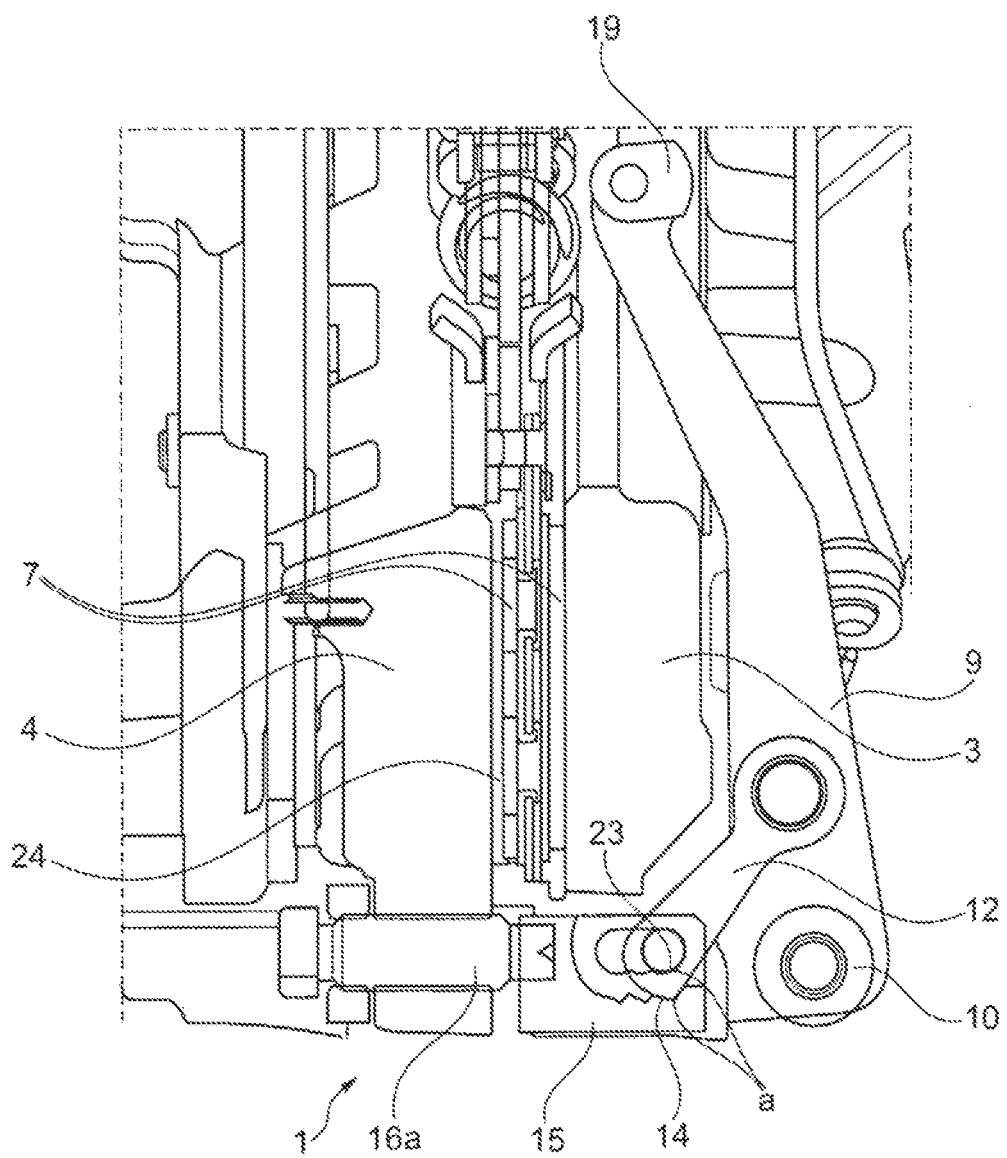
FIG. 2 is the friction clutch of FIG. 1, shown in a disengaged state.

FIG. 2 shows friction clutch 1 of FIG. 1 in the disengaged state with air space 24 between pressure plate 4 and friction linings 7, so that no torque is transmitted through friction clutch 1. The axial displacement of the pressure plate takes place due to axial loading of pressure members 19 by the disengaging mechanism in the direction of opposing pressure plate 3, while moving knee levers 9 on pivot bearings 10. This causes pressure levers 12 to pivot, and via joint sockets 23 in position a and stops 14 in position a—with friction clutch 1 depicted here in the as yet unadjusted state—they impose force on pendulum piece 15 against adjusting screws 16a.

Figure 3:
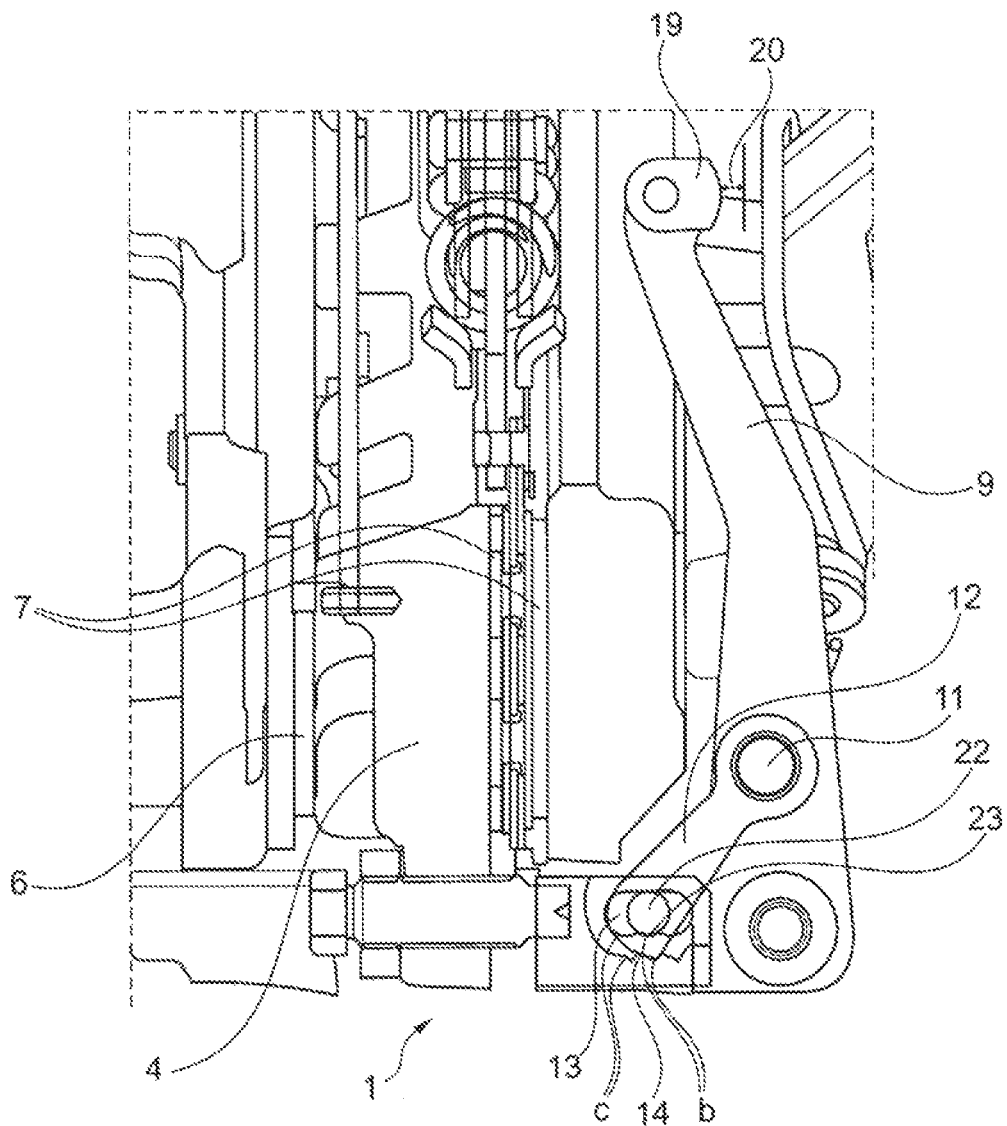
FIG. 3 is the friction clutch of FIGS. 1 and 2 after an adjusting procedure.

FIG. 3 shows friction clutch 1 in the engaged state after an adjustment due to wear of friction linings 7. Pressure levers 12 are now located in stop 14 of position b and pivot pins 22 are in joint sockets 23 of position b, so that despite the reduced thickness of the friction linings on pressure members 19 of knee levers 9, axial clearance 20 of the new condition is restored. With additional wear of friction linings 7, pressure lever 12 and pivot pin 22 ultimately move to position c.

In summary, there occurs an adjustment process from position a to position b on the basis of FIGS. 1 through 3, as follows: if axial clearance 20 decreases, the kinematics and the basic position of the lever mechanics of knee levers 9, pressure levers 12 and pivot joints 11, 13 change. Due to the changed force conditions of cup spring 6 and the changed kinematics, because of the disengaging mechanism resting against pressure members 19, with the friction clutch engaged or at the beginning of a process of disengaging friction clutch 1, forces of displacement in the direction of pressure plate 4 appear at pivot joints 13 and stops 14, which result in skipping over the regions of joint sockets 23 and stops 14 which delimit the individual positions a/b, or positions b/c when there is additional wear.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS 1 friction clutch
2 dual clutch
3 opposing pressure plate
4 pressure plate
5 stop plate
6 cup spring
7 friction lining
8 clutch plate
9 knee lever
10 pivot bearing
11 pivot joint
12 pressure lever
13 pivot joint
14 stop
15 pendulum piece
16 means
16a adjusting screw
17 leg spring
18 housing
19 pressure member
20 axial distance
21 adjusting device
22 pivot pin
23 joint socket
24 air space
a position
b position
c position

What is claimed is:

1. A friction clutch, comprising:
 a traction mode and power take-off;
 a cup spring;
 a pressure plate;
 an opposing pressure plate; wherein the pressure plate is axially pre-stressed, applying a load to the cup spring, against the opposing pressure plate;
 a housing;
 a clutch plate, wherein the opposing pressure plate is connected to the housing while tensioning friction linings of the clutch plate, wherein the pressure plate is displaceable against the effect of the cup spring by means of a plurality of pressure levers distributed along the periphery that are rotatably arranged by means of a first plurality of pivot joints on a plurality of knee levers that are axially stressed by a disengaging mechanism and have a specifiable axial distance relative to the disengaging mechanism, and means for adjusting the specifiable axial distance; and,
 an automatic adjusting device disposed between the pressure levers and the pressure plate in series with the means.

2. The friction clutch as recited in claim 1, wherein the plurality of pressure levers is flexibly connected by means of a second plurality of pivot joints at a plurality of axial positions of an axially movable pendulum piece and forms an adjustable stop, which is axially movable in multiple stages at the plurality of axial positions on the pendulum piece.

3. The friction clutch as recited in claim 2, wherein respective divisions of the plurality of axial positions of the multi-stage adjustable pivot joint and of the adjustable stop are identical.

4. The friction clutch as recited in claim 3, wherein when wear of friction linings for the clutch plate is exceeded over a divisional distance of positions and stops in an engaged or disengaging state of the friction clutch contrary to the effect of the cup spring, a pivot pin of the pressure lever is moved to a next position, which is farther from the plurality of knee levers, and the plurality of pressure levers is moved to a next stop which is farther from the plurality of knee levers.

5. The friction clutch as recited in claim 2, wherein when there is wear present on friction linings for the clutch plate, travel of the plurality of knee levers is limited by:
 the disengaging mechanism; or
 a leg spring, which is situated between a component, that is assigned to the opposing pressure plate, and the plurality of knee levers.

6. The friction clutch as recited in claim 2, wherein when there is wear and the friction clutch is engaged, pivot pins of the plurality of pressure levers are lifted by means of the pre-tensioning of the cup spring from a first position of joint sockets of the plurality of second pivot joints and are movable in a direction of the pressure plate to an adjacent position of the joint socket.

7. The friction clutch as recited in claim 6, wherein radial inward movement of the pivot pins is limited.

8. The friction clutch as recited in claim 2, wherein the plurality of pressure levers has a periphery in an area of the adjustable stop to the axially movable pendulum piece, which is asymmetrical relative to a pivot point of the second plurality of pivot joints.

9. The friction clutch as recited in claim 1, wherein the means situated between pressure plate and pendulum piece is an adjusting screw to preset the specifiable axial distance.

* * * * *